United States Patent [19]
Legris

[11] 3,917,318
[45] Nov. 4, 1975

[54] MODULAR COUPLING

[75] Inventor: Andre Legris, St-Maur, France

[73] Assignee: Societe Legris France S.A., Ozoir-la-Ferriere, France

[22] Filed: June 28, 1974

[21] Appl. No.: 484,246

[30] Foreign Application Priority Data
July 3, 1973   France .............................. 73.24471

[52] U.S. Cl. ................... 285/18; 46/26; 285/137 R; 285/150; 285/322
[51] Int. Cl.² ......................................... F16L 35/00
[58] Field of Search ........ 285/137 R, 150, 322, 155, 285/18, 156, 61, 64, 423; 46/25, 26, 38, 39; 138/115, 116, 117; 137/608

[56] References Cited
UNITED STATES PATENTS

| | | | |
|---|---|---|---|
| 2,584,845 | 2/1952 | Crowley | 285/93 X |
| 3,220,141 | 11/1965 | Goss | 46/28 |
| 3,305,982 | 2/1967 | Steele | 46/25 |
| 3,560,027 | 2/1971 | Graham | 285/150 |
| 3,650,548 | 3/1972 | Hussauf | 285/137 R |
| 3,653,689 | 4/1972 | Sopy et al. | 285/322 |
| 3,698,432 | 10/1972 | Kutz | 137/271 |

FOREIGN PATENTS OR APPLICATIONS

| | | | |
|---|---|---|---|
| 1,808,208 | 9/1970 | Germany | 46/25 |
| 586,805 | 4/1947 | United Kingdom | 46/25 |
| 481,297 | 3/1938 | United Kingdom | 46/25 |

*Primary Examiner*—Dave W. Arola
*Attorney, Agent, or Firm*—Brooks Haidt Haffner & Delahunty

[57] ABSTRACT

A modular coupling for fluid carrying conduits or electrical conductors comprising a rectangular parallelepipedonal body formed with at least one dovetail projection on one face and at least one pair of perpendicularly intersecting conforming dovetail grooves on an opposite face for joining the coupling to a further coupling having projections and grooves of identical cross-section.

11 Claims, 15 Drawing Figures

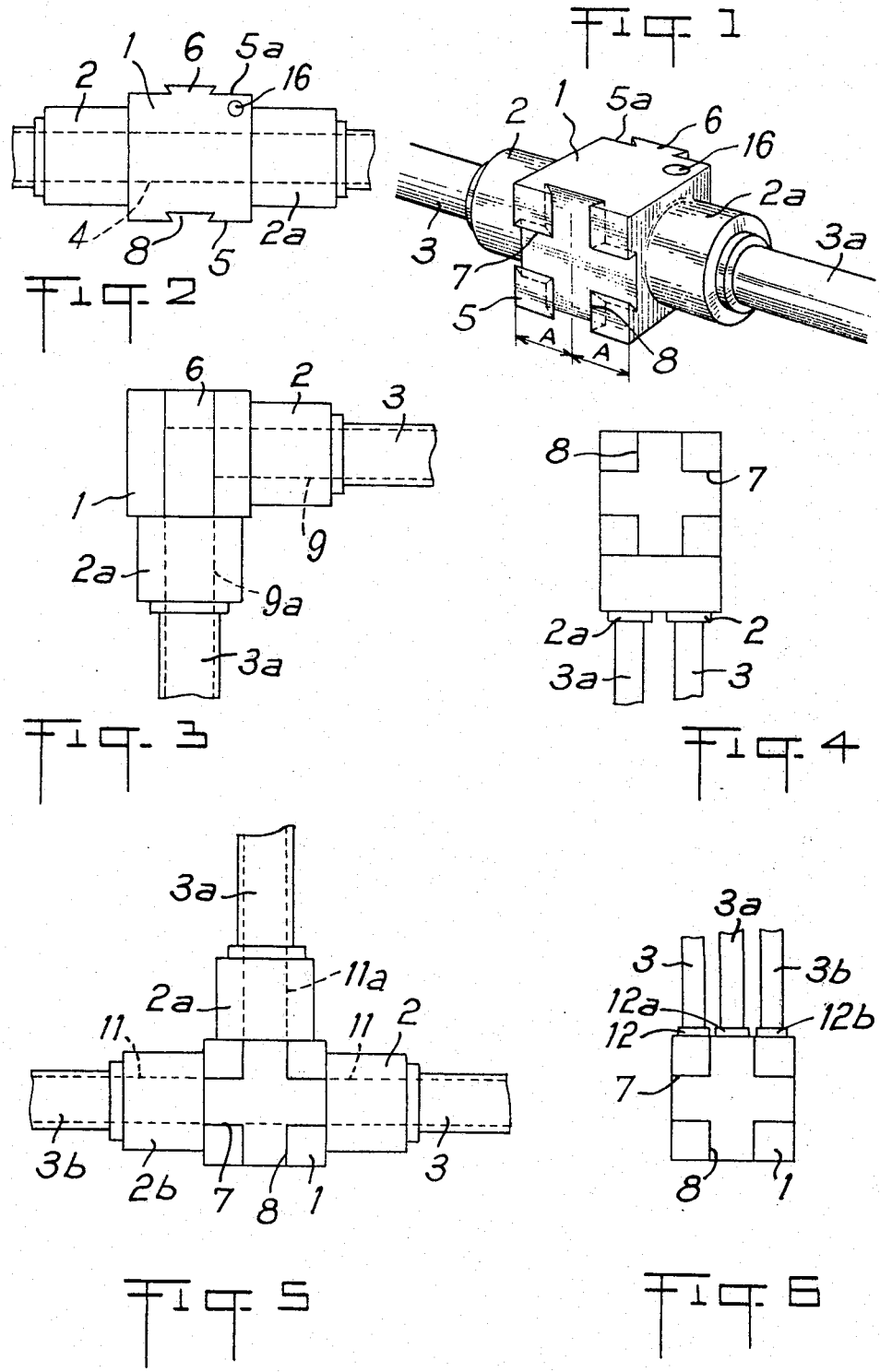

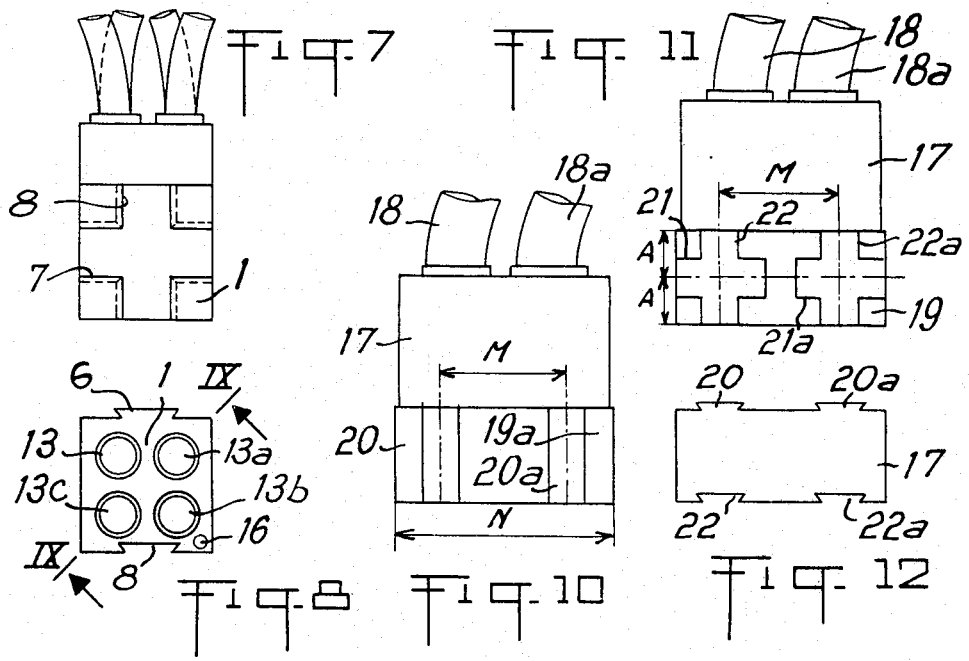
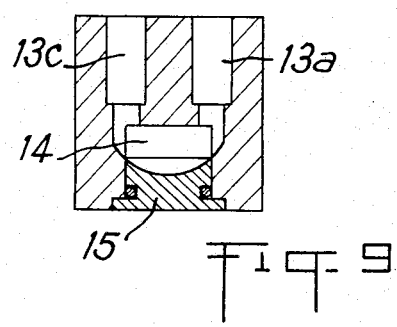
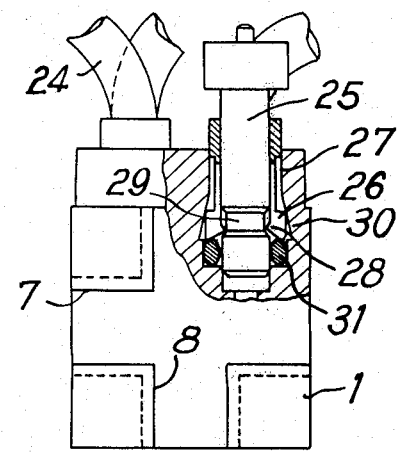
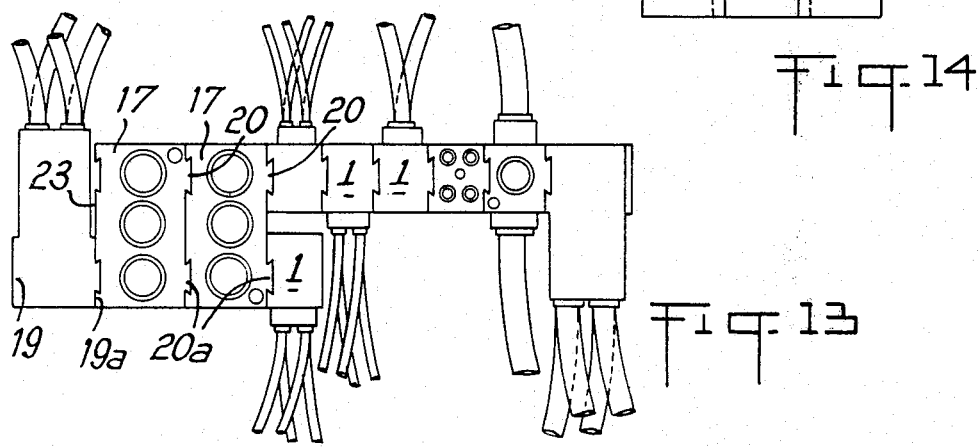

MODULAR COUPLING

The present invention relates to couplings for connection and control purposes.

Attaching modular elements by means of male and female members having a dovetail cross-sectional configuration is known both for attaching electric elements and for elements for coupling fluid conduits. From U.S. Pat. No. 3,512,553 and published French Pat. No. 2,085,344 it is known to utilise elements which are interconnected by such attachment means. However, this known kind of coupling does not enable the elements to be oriented at will in several directions. Moreover, these devices do not readily permit tubes of differing diameters to be coupled. From published French Pat. Publication No. 2,172,827 there are also known means which permit elements of different sizes to be juxtaposed, but attaching these elements necessitates special profiles.

According to the present invention there is provided a modular connection and control coupling comprising assembly means on two opposite faces of the coupling, at least two openings on a face other than said opposite faces, and at least one passage extending through said coupling to communicate said openings, said assembly means comprising at least one projection on one of said opposite faces and at least two intersecting grooves on the other of said opposite faces each adapted to receive the projection of a contiguous coupling having an identical form of assembly means.

This device according to the invention makes it possible to form simple or multiple lines of assemblies of modular couplings which are thus rendered integral with each other. It is possible to utilise simultaneously elements of different dimensions, and if desired each element can be oriented in several different directions.

The linkage passage or passages may be equipped with rapid connectors of the kind forming the subject of U.S. Pat. No. 3,653,689 which do not need any threads for attaching.

The modular assemblies may advantageously be secured simply to a flat surface by means of fasteners engaged in holes provided in the elements. Each coupling element is preferably independent so that its circuit does not communicate with those of the other elements.

The internal passages enable any known modes of junctions to be obtained, such as straight pipe unions, T unions, elbow unions or cruciform unions.

It is also possible to install, instead of a fluid carrying tube, a pressure sensor enabling the presence of a fluid to be determined.

Such a device makes it possible to obtain assemblies of connection and control which are very compact and inexpensive.

Other characteristics and advantages of the present invention will be better understood upon reading the following description of a number of exemplary embodiments and referring to the accompanying drawings in which:

FIG. 1 is a view in perspective of a pipe union according to the invention;

FIG. 2 is a top plan view of the union of FIG. 1;

FIG. 3 is an elevational view of an elbow union;

FIG. 4 is an elevational view of a union having two parallel outlets;

FIG. 5 is an elevational view of a T union;

FIG. 6 is an elevational view of a T union having parallel outlets;

FIG. 7 is an elevational view of a union having four parallel outlets;

FIG. 8 is a plan view of the union shown in FIG. 7;

FIG. 9 is a section taken along line IX-IX of FIG. 8;

FIG. 10 is an elevational view of a coupling for pipes of large dimensions;

FIG. 11 is an elevational view of the coupling shown in FIG. 10 when viewed from the opposite side;

FIG. 12 is a plan view of the coupling shown in FIG. 10;

FIG. 13 is a view of a connected assembly of couplings according to the invention; and FIG. 14 is a view of a coupling on which a pressure sensor has been fitted.

Figure 15:
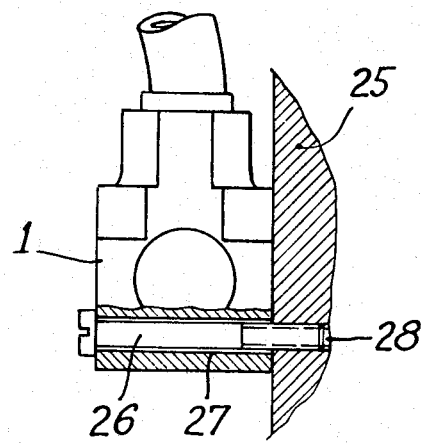
FIG. 15 is a view of a coupling body attached to a flat surface by screw means.

In FIGS. 1 and 2 there is shown a union formed of a rectangular parallelepipedonal body 1 extended by two tubular necks 2, 2a in which the ends of two pipes 3, 3a respectively, are engaged and held by any means such as a quick assembly member which is the subject of U.S. Pat. No. 3,653,689. Interiorly of the coupling there is provided a passage which enables the pipes 3, 3a to be linked and which is formed of a rectlinear conduit 4 in the case of FIGS. 1 and 2.

On two opposite faces 5, 5a the body 1 has assembly members which on one face 5 are constituted of a male member 6 in the shape of a rib of dovetail configuration and on the other face of two perpendicularly intersecting grooves 7, 8 in which the male member 6 of another contiguous coupling can be selectively engaged. The assembly faces 5, 5a are formed by square surfaces having a side length 2A, where A is the distance between the axis of a groove 7, 8 or the male member 6 and one of the edges defining the said faces.

FIG. 3 shows an elbow union in which the tubular necks 2, 2a are mutually perpendicular and the internal passage comprises two perpendicular conduits 9, 9a.

FIG. 4 shows a union with two parallel outlets in the form of pipes 3, 3a engaged in the tubular necks 2, 2a which are situated on the same face of the body 1. The internal passage 10 in this embodiment is not illustrated but is U-shaped.

In FIG. 5 there is shown a T union in which the necks 2, 2a, 2b are disposed along three directions on the body 1 and are connected by a passage comprising a single rectilinear conduit 11 into which a perpendicular conduit 11a from pipe 3a opens.

In FIG. 6 there is shown a T union having parallel outlets whose tubular necks 12, 12a, 12b are situated on the same face of the body 1.

In FIGS. 7, 8 and 9 there is shown a "cruciform" union with parallel outlets. The term "cruciform" signifies that the union of FIGS. 7 to 9 is equivalent to one in which four separate conduits are connected together in the usual cruciform array although in this embodiment the conduits have been rearranged to lie parallel to one another. The tubular necks 13, 13a, 13b, 13c of the conduits are thus disposed on the same face and the various conduits open into a connecting bore 14 closed by a plug 15 (FIG. 9).

The body 1 of the coupling has a bore 16 into which a fastener such as a bolt can be engaged for the purpose of mounting such a coupling on a flat surface.

FIGS. 10, 11 and 12 show another embodiment of a coupling, in this case one intended to be utilised with pipes of larger cross-section.

To this end the body 17 in this embodiment which as in the previous cases comprises an internal passage for connecting the pipes 18, 18a, comprises two opposite assembly faces 19, 19a of substantially twice the size of the previous surfaces 5, 5a.

Two male members 20, 20a of dovetail-shaped section are provided on the face 19a, and the face 19 has two sets of intersecting grooves 21, 22 and 21a, 22a identical with the grooves 7 and 8 shown in FIG. 1.

In order to enable the couplings shown in FIGS. 1 to 9 to be mounted on the body 17 of the larger size of coupling the length of the grooves 21, 22 and of the male members 20, 20a still equals 2A and the interaxial distance M between the two male members 20, 20a or between the grooves 22, 22a equals 2A increased by a functional tolerance. Likewise, the major side N of the rectangular surfaces 19, 19a equals 4A increased by a functional tolerance.

In FIG. 13 there is shown a mode of assembling a plurality of the larger type of couplings on which the smaller type of couplings 1 are mounted. As can be seen from FIG. 13 the faces 19, 19a of the larger type of coupling jut out slightly from the outline of the main body 17 so as to keep a space 23 between two coupling bodies 17 of the larger type.

In FIG. 14 there is shown a coupling of the larger type in which there are three conduits 24 and in place of a fourth conduit there is provided a pressure sensor 25 which enables the presence of a fluid to be detected in the coupling. This pressure sensor is mounted, as are the three conduits 24, using a rapid connector according to U.S. Pat. No. 3,653,689 formed by a housing 27 in which a flexible clamp 26 is fitted. The clamp 26 has a plurality of jaws 28 adapted to be engaged in the wall of a tube or in the groove 29 of the pressure sensor, the said housing 27 having in its bore a divergent zone 30 for gripping the jaws of the clamp. An O-ring 31 ensures sealing of the tube or of the end of the pressure sensor.

Each of the couplings described in FIGS. 1 to 9 may carry a pressure sensor instead of a tube 3, 3a.

The embodiments of FIGS. 1 to 4 can be used for positioning a pressure sensor at the end of a tube, while in the embodiments of FIGS. 5 and 6 there is provided a union junction which can communicate a pressure sensor with a continuous conduit. The couplings shown in FIG. 7 and FIG. 14 enable an elbow union with a pressure sensor to be obtained.

It is also possible to fit in each of the outlet orifices of the couplings either removable plugs or control instruments such as manometers which have at their tips grooves like the groove 29 of the pressure sensor 25.

The coupling according to the present invention has been exemplified as a coupling for fluid carrying conduits but it will be appreciated that the nature of the openings in the coupling body is immaterial to the scope of the invention and the coupling of the invention may, for example, be used to connect together electrical conductors.

FIG. 15 shows the way in which a coupling body 1 can be connected up to a flat surface 25 using a screw 16 engaging threadedly in a bore 28 of the surface and passing as a clearance fit through a bore 27 in the coupling body.

I claim:
1. A pipe coupling for interconnecting a pair of pipes for fluid flow from one of said pipes to the other of said pipes, said coupling comprising a body having first and second faces which face in opposite directions and having at least two other faces which face in directions different from said directions, said first face having at least one projection thereon extending transversely thereof, said projection having a cross-sectional dimension at a portion thereof spaced from said first face which is greater than the cross-sectional dimension of said projection intermediate said portion and said first face, said second face having at least a first groove and a second groove therein extending transversely of said second face and intersecting at an angle to each other, each said first and second groove having a cross-sectional shape which matches the cross-sectional shape of said projection and having a cross-sectional dimension at a portion thereof spaced from said second face which is greater than the cross-sectional dimension thereof which is intermediate said portion of said groove and said second face, whereby one said body may be interlocated with another said body by slidably inserting said projection of said one body in a said groove of said other body, said first-mentioned body also having a pair of pipe receiving openings therein, one of said openings being in one of said two other faces and the other of said openings being in one of said two other faces, and having a fluid passageway interiorly thereof extending from said one of said openings to said other of said openings for the passage of fluid therebetween, and means at each of said openings for securing a pipe to said body.

2. A pipe coupling as set forth in claim 1, wherein said body is of rectangular parallelepipedonal form, said projection and said first and said second groove are of conforming dovetail cross-sectional and said first groove and said second groove intersect perpendicularly.

3. A pipe coupling as set forth in claim 2, wherein said first and second faces are square, said first groove, said second groove and said projection are rectilinear, said projection bisects said first face and said first and said second grooves bisect said second face.

4. A pipe coupling as set forth in claim 2, wherein said projection is rectilinear and said first face has a second rectilinear projection thereon spaced from and parallel to said first-mentioned projection, said second projection having a cross-section the same as the cross-section of said first-mentioned projection, and wherein said second face has third and fourth intersecting grooves thereon spaced from said first groove and said second groove and of the same cross-sectional shape as said first groove and said second groove.

5. A pipe coupling as set forth in claim 4, wherein said first and second faces are rectangular and have minor sides of predetermined length, wherein the spacing between said first-mentioned projection and said second projection is greater than said predetermined length, said first groove is aligned with said third groove, said second groove is parallel to said fourth groove and the spacing between said second groove and said fourth groove is equal to said spacing between said first-mentioned projection and said second projection.

6. A pipe coupling as set forth in claim 1, wherein each of said openings is adapted to receive a smoothwalled tube, and wherein said means for securing a pipe to said body comprises flexible clamp means disposed within each of said openings, and a plurality of jaws formed on said clamp means and movable into engagement with the wall of said tube, each of said openings having a wall which increases in diameter in a direction away from its associated other face for gripping said jaws of the clamp, and further comprising a sealing gasket disposed in each of said openings for engaging said tube.

7. A pipe coupling as set forth in claim 1, wherein said body has four of said other faces and wherein said body has an opening therethrough extending between two oppositely facing other faces other than said first-mentioned two other faces for receiving means for securing said body to a support.

8. A pipe coupling as set forth in claim 1, wherein both said openings are in one of said other faces.

9. A pipe coupling as set forth in claim 1, wherein one of said openings is in one of said two other faces and the other of said openings is in the other of said two other faces.

10. A pipe coupling as set forth in claim 9, wherein said one of said two other faces is at right angles to said other of said two other faces.

11. A pipe coupling as set forth in claim 9, wherein said two other faces are oppositely facing.

* * * * *